Dec. 11, 1962 T. A. GEARY 3,067,764
DIAPHRAGM VALVES
Filed April 27, 1960 2 Sheets-Sheet 1
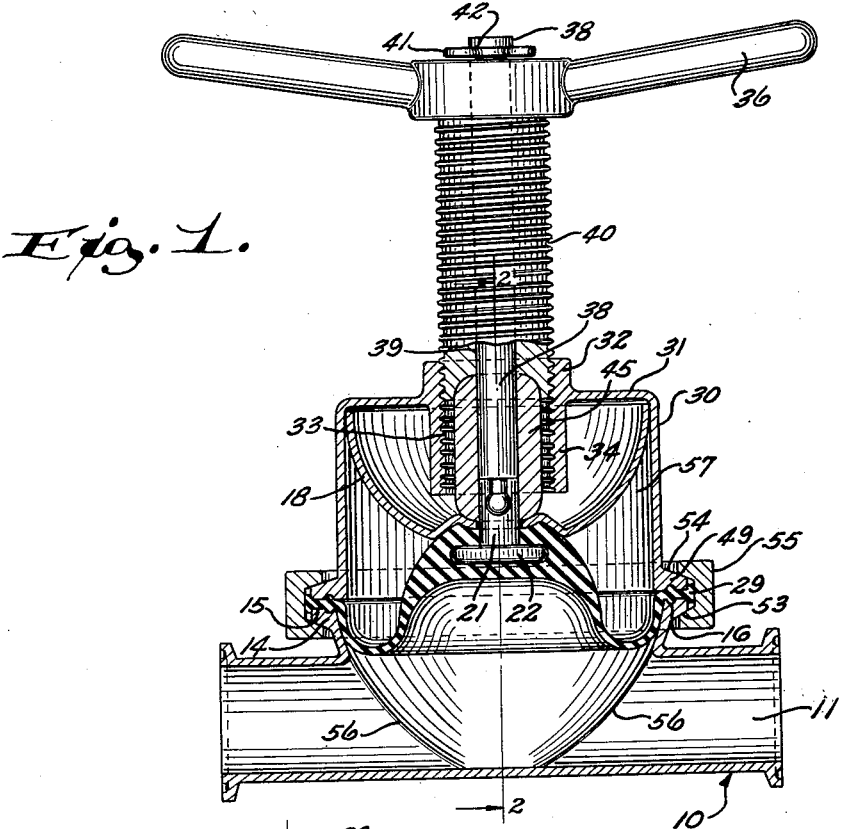
Fig. 1.
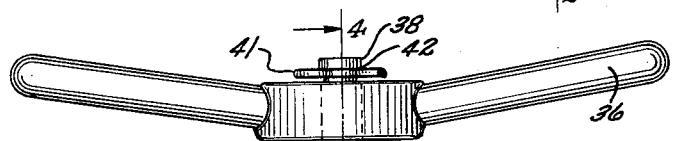
Fig. 3.
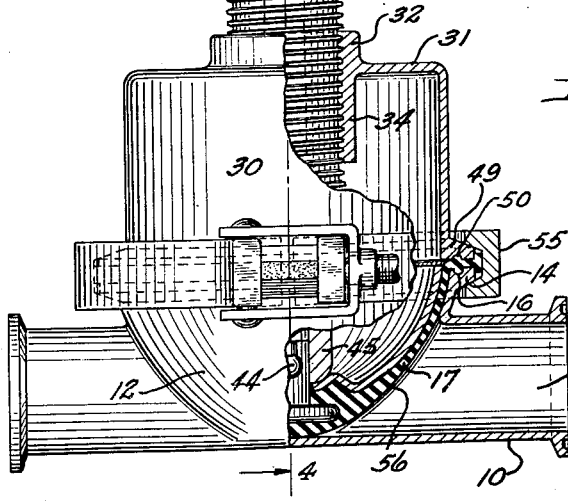
INVENTOR.
Thomas G. Geary
BY
Morsell & Morsell
ATTORNEYS.

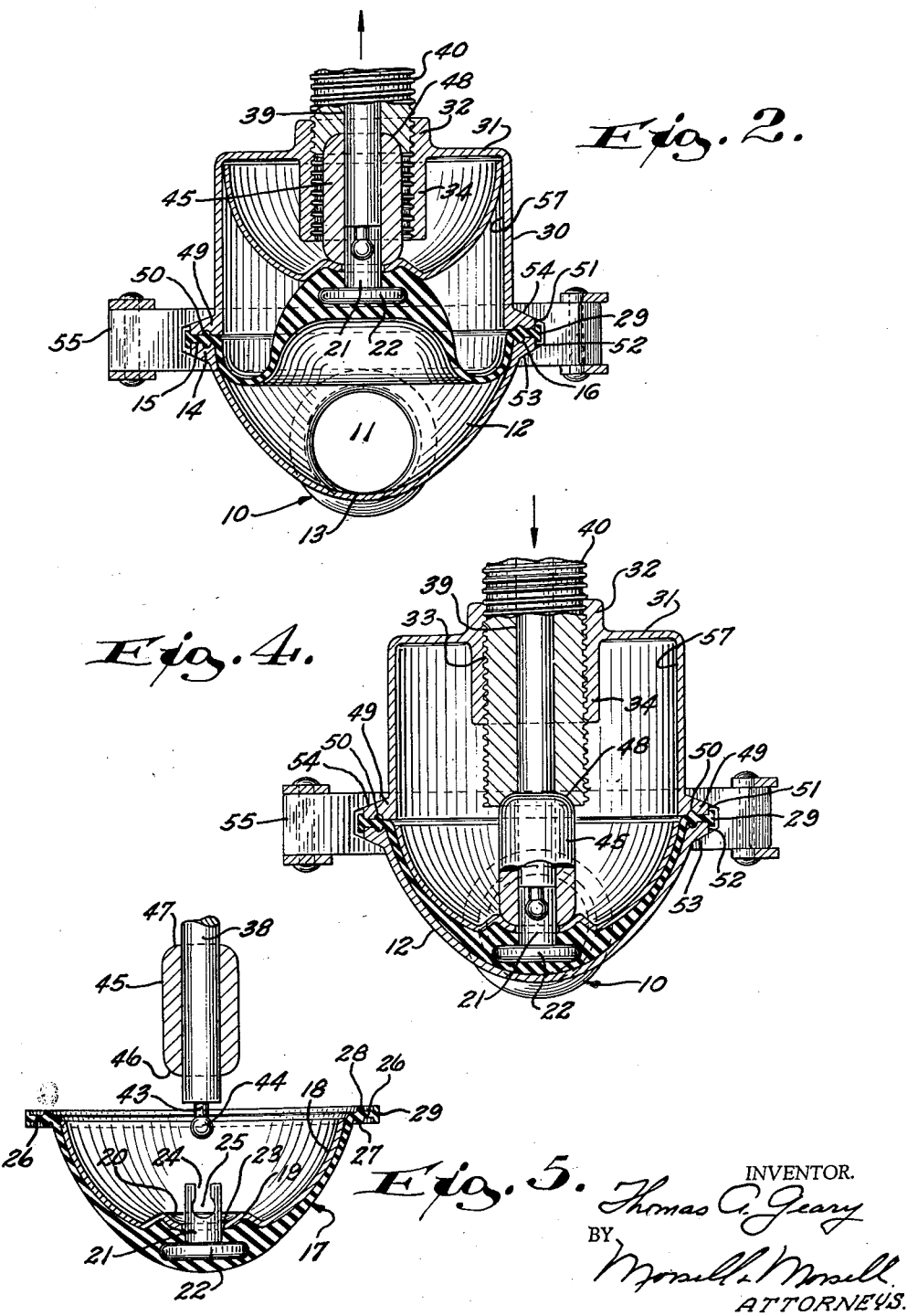

United States Patent Office 3,067,764
Patented Dec. 11, 1962

3,067,764
DIAPHRAGM VALVES
Thomas A. Geary, Kenosha, Wis., assignor to Ladish Co., Cudahy, Wis., a corporation of Wisconsin
Filed Apr. 27, 1960, Ser. No. 25,150
10 Claims. (Cl. 137—315)

This invention relates to improvements in diaphragm valves.

The present invention relates to a valve which is adapted for use in milk lines and other applications where complete drainage through the pipe line, without any obstruction from weirs or humps is desired. With a construction where there is no weir or ridge against which to seal the obtaining of a tight seal when the valve is in closing position is difficult. It is, therefore, a general object of the present invention to provide a valve wherein the diaphragm provides a complete closure when it is in closing position without use of a weir or hump.

A further object of the present invention is to provide a valve of the class described wherein the valve handle rises with the valve member as the valve is being opened. Thus by looking at the handle it is easy to ascertain the position of the valve.

A more specific object of the invention is to provide a diaphragm valve wherein there is novel means for effecting an operative connection between the handle and the diaphragm to permit opening and closing movement without applying torque to the diaphragm, and to provide for upward movement of the external handle portion.

A further object of the invention is to provide a construction as above described having novel means providing for self-alinement of the valve member as the handle is being turned down to close the valve.

A further object of the invention is to provide an improved diaphragm valve wherein the parts may be quickly disassembled for cleaning and wherein there are less parts than are present in diaphragm valves of the prior art.

A further object of the invention is to provide a diaphragm valve including novel means on the outer periphery of the diaphragm for detachably holding the diaphragm in assembled position, said means preventing the diaphragm from being pulled out of sealing engagement at the joint due to high pressures which may occur from time to time when other valves down the line are temporarily closed.

Other objects of the invention are to provide a diaphragm valve which is particularly suited for sanitary applications, which is relatively simple in construction, which is fool-proof in operation, and which is otherwise well adapted for the purpose described.

With the above and other objects in view, the invention consists of the improved diaphragm valve, and all of its parts and combinations, as set forth in the claims, and all equivalents thereof.

In the accompanying drawings illustrating one complete embodiment of the preferred form of the invention, in which the same reference numerals designate the same parts in all of the views:

FIG. 1 is a longitudinal vertical sectional view through the valve body, the handle and the upper portion of its stem being shown in full and the valve being shown in open position;

FIG. 2 is a sectional view taken on the line 2—2 of FIG. 1;

FIG. 3 is a side elevational view showing the valve in closed position, parts being broken away and shown in vertical section;

FIG. 4 is a sectional view taken on the line 4—4 of FIG. 3; and

FIG. 5 is an exploded view showing the diaphragm alone, disconnected from its stem, and showing the sleeve in a temporarily raised position to permit connection and disconnection.

Referring more particularly to the drawing, the numeral 10 designates a valve body having a main bore 11. Intermediate the length of the body is a spherical enlargement 12, the bottom of which is tangent to the bottom of the bore as at 13, FIG. 2. The spherical enlargement continues upwardly a substantial distance above the bore and terminates in an annular outwardly directed flange 14 having an annular face 15 with an annular groove 16.

A generally spherical diaphragm 17 having a thickened central portion is preferably formed of silicone or other synthetic material. This diaphragm is shown in FIG. 5. It is shaped to substantially fit the spherical enlargement 12 of the valve body. The diaphragm is shown separated from the body in FIG. 5. Here it will be seen that when the diaphragm is in the cup-shaped condition of FIG. 5 it accommodates a metallic cup 18 having a centrally located annular rib 19 surrounding a concave seat 20, the diaphragm also preferably having an annular rib to fit within the underside of the rib 19 of the cup 18.

A stud 21 has an enlarged head 22 anchored in the material of the diaphragm 17, the stem of the stud projecting upwardly through the diaphragm and through a central hole 23 in the seat portion 20 of the cup. Communicating with the upper end of the stud 21 is a slot 24, the lower portion of which merges with a spherical socket 25.

Projecting laterally at the upper edge of the diaphragm is an annular rim 26 having a lower annular bead 27 and an upper annular bead 28. The outer portion of the rim is in the form of a T as at 29. The diaphragm is formed of suitable flexible material such as rubber or synthetic rubber and may be a silicone synthetic.

A bonnet 30 has a top wall 31 with a central boss 32 which is internally threaded as at 33. The boss projects a substantial distance below the top 31 as at 34 and also projects externally above the top 31.

A handle 36 slips detachably onto the upper end portion of a valve stem 38. The latter fits slidably and rotatably into the bore 39 of an operating screw 40, which screw is threaded into the bushing 32. The handle 36 is detachably mounted on the upper end of the screw 40 to cause rotation of the screw when the handle is turned. Outward displacement of the handle is normally prevented by a clip 41 which detachably snaps into engagement with a groove 42 in the upper end of the stem 38.

The lower end of the stem 38 has a projecting portion 43 of reduced diameter (see FIG. 5) carrying a lower end ball 44. It is apparent from FIG. 5 that the ball and its stem 43 may be engaged in the spherical socket 25 and communicating slot 24 of the diaphragm stud 21 by lateral movement. Thereafter by sliding a sleeve 45 downwardly on the stem 38 so that it overlaps the projecting portion of the stud 21, the diaphragm is detachably connected to the stem as shown in the other views. It is to be noted that the sleeve has a rounded lower end 46 (see FIG. 5) to conform to the contour of the seat 20 in the middle of the cup 18. The sleeve also has a rounded upper end 47 to fit in a recess 48 of similar shape in the lower end of the screw 40.

The lower margin of the bonnet has a laterally projecting annular flange 49 provided with an annular groove 50. In assembly the rim of the diaphragm fits on top of the annular flange 14 of the valve body with the lower diaphragm bead 27 received in the groove 16 which is in the upper face of the flange 14. The flange 49 of the bonnet fits on top of the rim of the diaphragm as shown, with the upper bead 28 of the diaphragm rim received in the groove 50 of the bonnet flange 49. It is to be noted that the flanges have peripheral portions 51 and 52 against which the heads of the T's 29 abut. The flange 14 has a tapered lower face 53 and the flange 49 a tapered upper face 54. These are acted on by a clamping band 55, having a groove with correspondingly tapered faces, in a well-known manner to draw the flanges together, when the clamping band is taken up. This compresses the gasket rim 26 therebetween to form a tight yet readily disconnectable joint. It is to be noted that in the assembled construction the head of the T 29 at the outer margin of the diaphragm rim prevents the rim from being pulled loose at the joint due to internal pressures.

Operation

In use, when the valve is in the open condition of FIG. 1 there is a straight through flow permitted without any obstruction from weirs or humps, as is clear from FIG. 2, and it is to be noted that the full diameter of the bore 11 is available for the passage of fluid. To close the valve the handle 36 is rotated. This causes rotation of the screw 40 in an inward direction forcing the stem 38 downwardly. This exerts a pressure on the inverted center of the diaphragm (as in FIG. 1) which pressure is transmitted principally through the sleeve 45. During such rotation of the screw no torque is transmitted to the diaphragm because of the ball and socket connection at 44—25 and because of the sleeve arrangement. When the diaphragm is turned all the way down it assumes the position shown in FIGS. 3 and 4. As final pressure is exerted through the metal cup 18 on the diaphragm, the material of the diaphragm is extruded a slight amount into each port 56 to make a perfect seal against the margins of the ports, which margins are the juncture of the bore 11 with spherical portion 12. Thus the valve diaphragm actually seats on the ports 56 rather than against a weir.

To open the valve, the handle is rotated in a reverse direction to bring the parts to the condition of FIGS. 1 and 2. During this action the diaphragm is moved from the cup shape of FIGS. 3 and 4 to a condition where its center is inverted upwardly as shown, the metal cup 18 leaving the diaphragm, except at the bottom of the cup, and said cup being of an external diameter to fit within and be guided by the inner surface 57 of the wall of the bonnet, the top of the metal cup fitting close to the top of the bonnet when the valve is fully open.

In dairy lines it is necessary to frequently disassemble the valves for cleaning. This may be quickly accomplished by loosening and removing the clamping band 55 and then lifting off the bonnet 30 and connected parts including the diaphragm. Thereafter, the clip 41 is removed from the top of the valve stem and the handle 36 removed from its fit with the top of the screw 40. Then by unscrewing the operating screw 40 from the bonnet the screw may be lifted off of the stem 38. This then permits the sleeve 45 to be slid upwardly as shown in FIG. 5 to permit disconnection of the ball and socket connection between the diaphragm and stem. The parts may then be readily cleaned individually. To reassemble the parts the reverse operation is carried out.

It is clear that the improved diaphragm valve is well suited for sanitary installations. Due to the novel connection between the lower end of the valve stem and the diaphragm, the operating screw and handle raise and lower externally so that it is readily apparent whether the valve is open or closed. In addition, the arrangement of the sleeve 45 and cup 18 in association with the diaphragm provides an efficient means for transmitting closing pressure to the valve without subjecting the diaphragm to torque from rotation of the handle, the construction also facilitating assembly and disassembly. In addition, the sleeve 45 with its spherical ends allows self-alinement as the handle is being turned down.

Due to the novel rim on the diaphragm, with the annular beads and the external T, there is no danger of pressures, which might act against the diaphragm when it is in the open condition of FIG. 2, pulling the rim of the diaphragm out at the joint. Such pressures might occur when a valve down the line is closed to thus allow pressures to build up against the opened valve diaphragm to exert a pulling force on the clamped rim.

It is to be understood that the present invention is not to be limited to the exact details of construction shown and described for obvious modifications will occur to persons skilled in the art.

What I claim is:

1. In a diaphragm valve having a valve body with an enlargement intermediate its length, said body having aligned bore portions communicating with opposite sides of said enlargement to provide valve seats and said enlarged portion having an opening which is offset laterally from the axis of said bore portions, a bonnet detachably connected to said opening, a normally cup-shaped flexible diaphragm having a rim sealingly clamped between said body and bonnet around the margin of said opening of the enlarged portion, an external handle having a projecting externally threaded sleeve threaded into said bonnet, a valve stem slidably mounted in said sleeve, connecting means including parts which are separable by movement transversely of said stem detachably connecting the lower end of said stem to said diaphragm at the center of said diaphragm, means between said sleeve and diaphragm and normally surrounding said separable parts for normally maintaining the latter in operable condition whereby said last-mentioned means urges the diaphragm toward closing position within said enlargement and against said seats when the handle is turned inwardly, and means between said threaded sleeve and stem for moving said diaphragm toward open position when said handle is rotated in a reverse direction.

2. In a diaphragm valve having a valve body with an enlargement intermediate its length, said body having aligned bore portions communicating with opposite sides of said enlargement to provide valve seats and said enlarged portion having an opening which is offset laterally from the axis of said bore portions, a bonnet detachably connected to said opening, a normally cup-shaped flexible diaphragm having a rim sealingly clamped between said body and bonnet around the margin of said opening of the enlarged portion, a metal cup engaging within and connected to the center of said diaphragm, an external handle having a projecting externally threaded sleeve threaded into said bonnet, a valve stem slidably mounted in said sleeve, connecting means including a ball and socket connection which is separable by movement transversely of said stem connecting the lower end of said stem to said diaphragm at the center of said cup and diaphragm, separate means between said sleeve and said cup and diaphragm and normally surrounding said connecting means for normally maintaining the latter in operable condition whereby said separate means urges the diaphragm toward closing position within said enlargement and against said seats when the handle is turned inwardly, and means between said threaded sleeve and stem for moving said cup and diaphragm toward open position when said handle is rotated in a reverse direction.

3. In a diaphragm valve having a valve body with an enlargement intermediate its length, said body having aligned bore portions communicating with opposite sides of said enlargement to provide valve seats and said enlarged portion having an opening which is offset laterally from the axis of said bore portions, a bonnet detachably connected to said opening, a normally cup-shaped flexible diaphragm sealingly clamped between said body and bonnet around the margin of said opening of the enlarged portion and having a stud projecting from its center toward said opening of the enlarged portion, an external handle having a projecting externally threaded sleeve threaded into said bonnet, a valve stem slidably mounted in said sleeve and having connection means at its lower end transversely detachably and rotatably connected to the upper end of said diaphragm stud, a movable sleeve surrounding said transversely detachable connection and normally maintaining said connection means in engagement and having an upper end in contact with the lower end of said handle sleeve and having its lower end engaging around the stud for urging the diaphragm toward valve closing position within said enlargement and against said seats when the handle is turned inwardly, and means between said threaded handle sleeve and stem for pulling said valve stem outwardly to open the valve when the handle is turned outwardly.

4. In a diaphragm valve having a valve body with an enlargement intermediate its length, said body having aligned bore portions communicating with opposite sides of said enlargement to provide valve seats and said enlarged portion having an opening which is offset laterally from the axis of said bore portions, a bonnet detachably connected to said opening, a normally cup-shaped flexible diaphragm sealingly clamped between said body and bonnet around the margin of said opening of the enlarged portion and having a stud projecting from its center toward said opening of the enlarged portion, a metal cup engaging said diaphragm and having a central hole through which said stud projects, an external handle having a projecting externally threaded sleeve threaded into said bonnet, a valve stem slidably mounted in said sleeve and having connecting means at its lower end transversely detachably connected to the upper end of said diaphragm stud, movable means normally surrounding said connecting means engageable with the lower end of said handle sleeve and having its lower end engaging the center of said cup around the stud for urging the cup and diaphragm toward valve closing position within said enlargement and against said seats when the handle is turned inwardly, and means between said threaded handle sleeve and stem for pulling said valve stem outwardly to open the valve when the handle is turned outwardly.

5. In a diaphragm valve having a valve body with an enlargement intermediate its length, said body having aligned bore portions communicating with opposite sides of said enlargement to provide valve seats and said enlarged portion having an opening which is offset laterally from the axis of said bore portions, a bonnet detachably connected to said opening, a normally cup-shaped flexible diaphragm sealingly clamped between said body and bonnet around the margin of said opening of the enlarged portion and having a stud projecting from its center toward said opening of the enlarged portion, a metal cup engaging said diaphragm and having a central hole through which said stud projects, an external handle having a projecting externally threaded sleeve threaded into said bonnet, a valve stem slidably mounted in said sleeve and having connected means at its lower end transversely detachably and rotatably connected to the upper end of said diaphragm stud, movable means normally surrounding said connecting means engageable with the lower end of said handle sleeve and having its lower and engaging the center of said cup around the stud for urging the cup and diaphragm toward valve closing position within said enlargement and against said seats when the handle is turned inwardly, and means between said threaded handle sleeve and stem for pulling said valve stem outwardly to open the valve when the handle is turned outwardly.

6. In a diaphragm valve having a valve body with an enlargement intermediate its length, said body having aligned bore portions communicating with opposite sides of said enlargement to provide valve seats and said enlarged portion having an opening which is offset laterally from the axis of said bore portions, a bonnet detachably connected to said opening, a normally cup-shaped flexible diaphragm sealingly clamped between said body and bonnet around the margin of said opening of the enlarged portion and having a stud projecting from its center toward said opening of the enlarged portion, a metal cup engaging said diaphragm and having a central hole through which said stud projects, an external handle having a projecting externally threaded sleeve threaded into said bonnet, a valve stem slidably mounted in said sleeve and having connecting means at its lower end transversely detachably connected to the upper end of said diaphragm stud, and having an upper end projecting beyond the handle, stop means detachably connected to said projecting end of the stem, movable means normally surrounding said connecting means engageable with the lower end of said handle sleeve and having its lower end engaging the center of said cup around the stud for urging the cup and diaphragm toward valve closing position within said enlargement and against said seats when the handle is turned inwardly, said handle sleeve engaging said stop means on the outer end of said stem to pull said valve stem outwardly to open the valve when the handle is turned outwardly.

7. In a diaphragm valve having a valve body with an enlargement intermediate its length, said body having aligned bore portions communicating with opposite sides of said enlargement to provide valve seats and said enlarged portion having an opening which is offset laterally from the axis of said bore portions, a bonnet detachably connected to said opening, a normally cup-shaped flexible diaphragm sealingly clamped between said body and bonnet around the margin of said opening of the enlarged portion and having a stud projecting from its center toward said opening of the enlarged portion, a metal cup engaging within said diaphragm and having a central hole through which said stud projects, an external handle having a projecting externally threaded sleeve threaded into said bonnet, a valve stem slidably mounted in said sleeve and having a lower end, connecting means including a ball and socket connection which is detachable by movement transversely of the valve stem between the upper end of said diaphragm stud and lower end of the valve stem, a movable sleeve surrounding said connecting means and having an upper end in contact with the lower end of said handle sleeve and having its lower end engaging the center of said cup around the stud for urging the cup and diaphragm toward valve closing position within said enlargement and against said seats when the handle is turned inwardly, and means between said threaded handle sleeve and stem for pulling said valve stem outwardly to open the valve when the handle is turned outwardly.

8. In a diaphragm valve having a valve body with an enlargement intermediate its length, said body having aligned bore portions communicating with opposite sides of said enlargement to provide valve seats and said enlarged portion having an opening which is offset laterally from the axis of said bore portions, a bonnet detachably connected to said opening, a normally cup-shaped flexible diaphragm sealingly clamped between said body and bonnet around the margin of said opening of the enlarged portion and having a stud projecting from its center toward said opening of the enlarged portion, an external handle having a projecting externally threaded sleeve threaded into said bonnet, a valve stem slidably mounted in said sleeve and having means at its lower end which is detachable by transverse movement detachably and rotatably connected to the upper end of said diaphragm stud, a movable sleeve surrounding said connection and having an upper end in contact with the lower end of said handle sleeve and having its lower end engaging the center of said diaphragm around the stud for urging the diaphragm toward valve closing position within said enlargement and against said seats when the handle is turned in a downward direction, and means between said threaded handle sleeve and stem for pulling said valve stem upwardly to open the valve when the handle is rotated in a reverse direction.

9. In a diaphragm valve having a valve body with an enlargement intermediate its length, said body having aligned bore portions communicating with opposite sides of said enlargement to provide valve seats and said enlarged portion having an opening which is offset laterally from the axis of said bore portions, a bonnet detachably connected to said opening, a normally cup-shaped flexible diaphragm sealingly clamped between said body and bonnet around the margin of said opening of the enlarged portion and having a stud projecting from its center toward said opening of the enlarged portion, an external handle having a projecting externally threaded sleeve threaded into said bonnet, a valve stem slidably mounted in said sleeve and having a ball and socket connection which is detachable by transverse movement between its lower end and the upper end of said diaphragm stud, a sleeve movably surrounding said connection and having an upper end in contact with the lower end of said handle sleeve and having its lower end engaging the center of said diaphragm around the stud for urging the diaphragm toward valve closing position within said enlargement and against said seats when the handle is turned in a downward direction, and means between said threaded handle sleeve and stem for pulling said valve stem upwardly to open the valve when the handle is rotated in a reverse direction.

10. In a diaphragm valve having a valve body with an enlargement intermediate its length, said body having aligned bore portions communicating with opposite sides of said enlargement to provide valve seats and said enlarged portion having an opening which is offset laterally from the axis of said bore portions, a bonnet detachably connected to said opening, a normally cup-shaped flexible diaphragm having a rim sealingly clamped between said body and bonnet around the margin of said opening of the enlarged portion, an external handle having a projecting externally threaded sleeve threaded into said bonnet, a valve stem slidably mounted in said sleeve, connecting means including a ball and socket which are separable by movement transversely of said stem detachably connecting the lower end of said stem to said diaphragm at the center of said diaphragm, means between said sleeve and said diaphragm and around said ball and socket detachably maintaining said ball and socket in engagement whereby said last-mentioned means urges the diaphragm toward closing position within said enlargement and against said seats when the handle is turned inwardly, and means between said threaded sleeve and stem for moving said diaphragm toward open position when said handle is rotated in a reverse direction.

References Cited in the file of this patent

UNITED STATES PATENTS

| | | |
|---|---|---|
| 1,992,043 | Saunders | Feb. 19, 1935 |
| 2,707,481 | McPherson | May 3, 1955 |
| 2,716,017 | Linker | Aug. 23, 1955 |

FOREIGN PATENTS

| | | |
|---|---|---|
| 918,546 | France | of 1947 |